United States Patent [19]

Takenoya et al.

[11] 4,187,789
[45] Feb. 12, 1980

[54] SEWING MACHINE WITH AN ELECTRONIC PATTERN STITCH CONTROL SYSTEM

[75] Inventors: Hideaki Takenoya, Hachioji; Machiro Makabe, Fussa, both of Japan

[73] Assignee: Janome Sewing Machine Co. Ltd., Tokyo, Japan

[21] Appl. No.: 893,359

[22] Filed: Apr. 4, 1978

[30] Foreign Application Priority Data

Apr. 4, 1977 [JP] Japan .................................. 52/37516

[51] Int. Cl.$^2$ .............................................. D05B 3/02
[52] U.S. Cl. ................................................. 112/158 E
[58] Field of Search ........... 112/158 E, 121.11, 121.12

[56] References Cited

U.S. PATENT DOCUMENTS

| | | | |
|---|---|---|---|
| 3,977,338 | 8/1976 | Wurst et al. | 112/158 E X |
| 4,086,862 | 5/1978 | Makabe et al. | 112/158 E |

FOREIGN PATENT DOCUMENTS 2734404  2/1978  Fed. Rep. of Germany ....... 112/158 E Primary Examiner—Peter P. Nerbun
Attorney, Agent, or Firm—Michael J. Striker

[57] ABSTRACT

The invention concerns a sewing machine with an electronic pattern stitch control system which operates the stitch forming device to change the relative positions of the needle and the sewn material, thereby to form a pattern. Addressing signals are applied to the address inputs of the memory at a high frequency to cause the contents of the memory to be successively produced at its output terminals. Comparing means compare this data output to pattern identifying signals generated by the user operated pattern selection switches. The addressing signals continue to be applied until a matched comparison is reached whereupon the data is applied to the stitch forming means.

4 Claims, 6 Drawing Figures

FIG. 2

| Address | Coordinate numbers |
|---|---|
| 0 | R E T |
| 1 | (1) |
| 2 | (2) |
| 3 | R E T |
| 4 | (3) |
| 5 | (4) |
| 6 | (5) |
| 7 | R E T |
| 8 | (6) |
| 9 | (7) |
| 10 | (8) |
| 11 | (9) |
| 12 | (10) |
| 13 | (11) |
| 14 | R E T |
| 15 | (12) |
| 16 | (13) |
| 17 | (14) |
| 18 | (15) |
| 19 | (16) |
| 20 | (17) |
| 21 | (18) |
| 22 | (19) |
| 23 | (20) |
| 24 | (21) |
| 25 | (22) |
| 26 | R E T |

Pattern 1: addresses 1–2
Pattern 2: addresses 4–6
Pattern 3: addresses 8–13
Pattern 4: addresses 15–25

FIG. 3

| Address | Coordinate numbers |
|---|---|
| 0 | (1, 3, 6, 12) |
| 1 | (7) |
| 2 | (4) |
| 3 | (8) |
| 4 | (2, 5, 9, 13) |
| 5 | (14) |
| 6 | (15) |
| 7 | (10) |
| 8 | (16) |
| 9 | (17) |
| 10 | (18) |
| 11 | (11) |
| 12 | (19) |
| 13 | (20) |
| 14 | (21) |
| 15 | (22) |

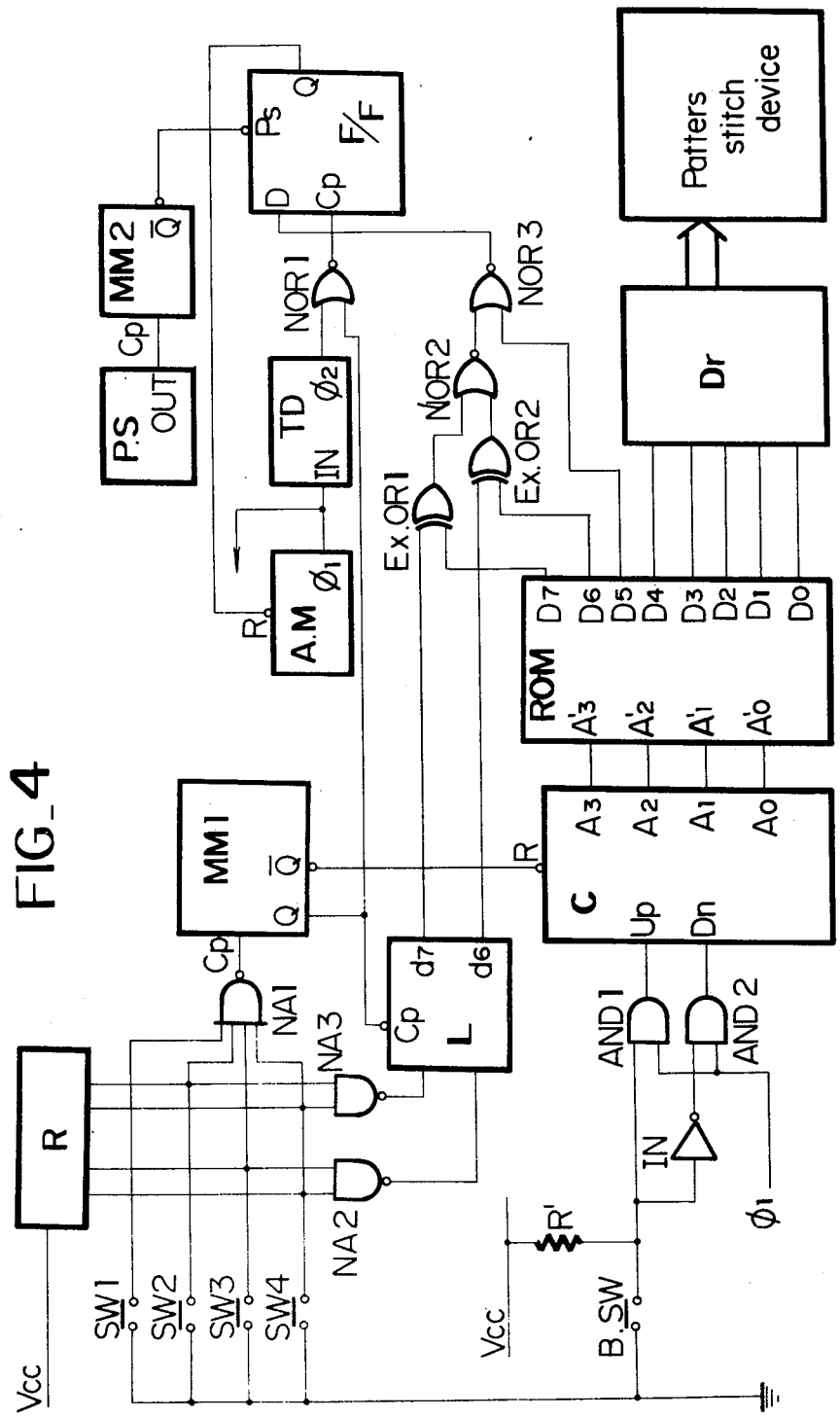
FIG_4

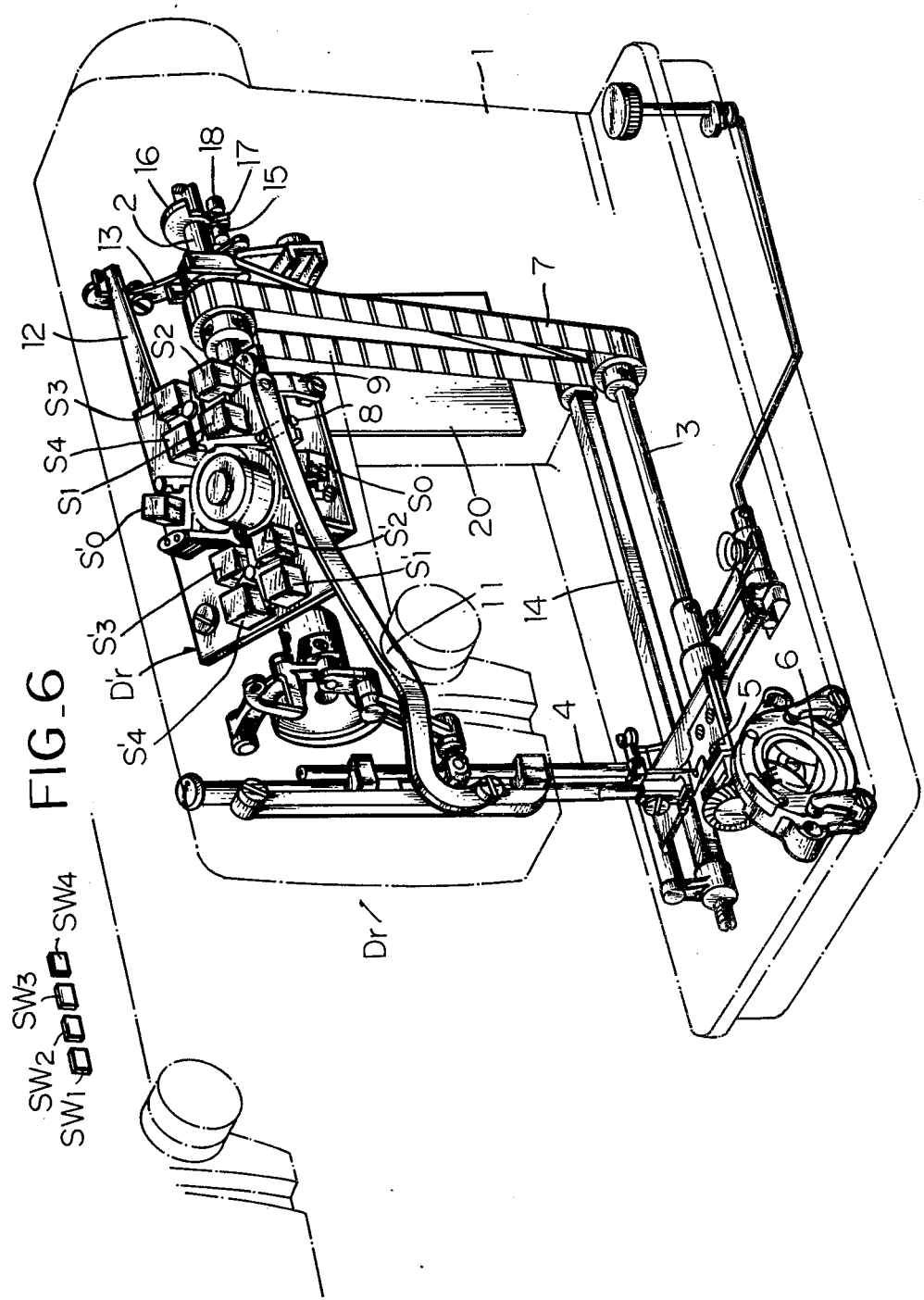
FIG_6

SEWING MACHINE WITH AN ELECTRONIC PATTERN STITCH CONTROL SYSTEM

Brief Description of the Invention

This invention relates to a sewing machine with an electronic pattern stitch control system, in which a semi-conductor memory is employed for storing a great number of pattern signals in order to afford a variety of stitch patterns.

The present widely used sewing machine are provided with a mechanical memory such as pattern cams to produce the stitch patterns. If many more stitch patterns are desired, then many more pattern cams are needed. As the result, the mechanism becomes bulky and more space is required in the sewing machine, and moreover the weight of the machine increases, and further the operation of the sewing machine becomes complicated.

It is known, in a sewing machine disclosed, for example, in U.S. Pat. No. 3,872,808 employing a semi-conductor memory storing pattern signals, to provide an additional address memory storing an initial address for each pattern in order to repeatedly read out a desired pattern from the pattern signal storing memory, for example the patterns 1-4 shown in FIG. 1 of the attached drawings. Such a progressive addressing operation for forming a pattern is performed using a counter operated in synchronism with a pulse generated once per rotation of the machine shaft. The repeated formation of a pattern is implemented by providing as the last signal a reset signal which resets the counter back to the count of the initial address. FIG. 2 is provided in order to further explain the prior art. This shows in a table the relations between the stitch numbers 1, 2, 3 . . . in FIG. 1 and the stitch coordinate numbers (1), (2), (3) . . . stored in the memory as so many signal. The RET signal produced at the end of each pattern is adapted to advance the counter to the initial address of the pattern. As a special function to trace back the pattern signals, for example, 22, 21, 20 . . . (back stitching), the RET signal is produced at both ends of each pattern as shown in FIG. 2.

The present invention has been provided to effectively utilize the pattern data storing memory without using the addressing memory and the address reset apparatus of the prior art. Namely the memory of the invention stores the pattern data words in a predetermined sequence, but which can be read out on command irrespectively of the sequence. The total stitch numbers of a pattern can be optionally selected among the total numbers of the data words stored in the memory. Further the same data words can be commonly used to form different stitch patterns. Thus, according to the invention, various stitch patterns can be effectively produced by a limited number of data words.

It is a primary object of the invention to store various kinds of stitching signals in a semi-conductor memory in a way simplifying the mechanism.

It is a second object of the invention to effectively arrange the stitch pattern signals in the memory and to effectively read out these pattern signals, in such a way as to effectively produce various stitch patterns.

It is a third object of the invention to provide a sewing machine which is mechanically simple and easily operated.

Many other features and advantages of the invention will be apparent from following explanation in reference to the preferred embodiment of the invention.

Brief Description of the Drawings

FIG. 2 shows the memorized pattern signals arranged in accordance to the prior art for actually producing the stitch patterns in FIG. 1, FIG. 3 shows the memorized pattern signals arranged in accordance to the invention, FIG. 4 shows an embodiment of a pattern control circuit diagram according to the invention, FIG. 5 shows a bit arrangement for the output word of the memory, FIG. 6 shows a sewing machine provided with the system of the invention.

Detailed Description of the Invention

Figure 1:
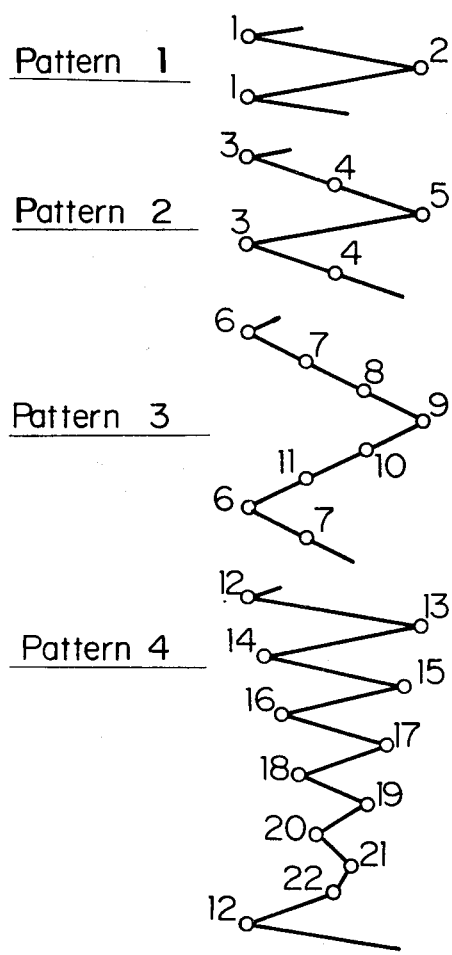
FIG. 1 shows stitch patterns by way of example.

The description of the invention will now be made in reference to the attached drawings showing a preferred embodiment of the invention. In reference to the stitch patterns in FIG. 1, the stitch numbers forming the common coordinates, namely the numbers 1, 3, 6, 12 and 2, 5, 9, 13 are read out by different addresses in FIG. 2. On the other hand, since these common coordinates are obtained by the common signals, such common coordinates can be read out by the common addresses as shown in FIG. 3, thereby in effect to reduce the number of addresses. Further the RET signals in FIG. 2 can be omitted to reduce the capacity of the memory.

FIG. 4 shows a pattern control circuit diagram of the invention, in which a needle bar control system is described, but a cloth feed control system is omitted for simplification of the explanation. SW1 to SW4 are normally opened pattern selecting switches each having one end connected to ground and the other end connected to the trigger terminal ($C_p$) of a monostable multivibrator (MM1) via NAND circuit (NA1), and also connected to the input side of Latch circuit (L) via NAND circuits (NA2) (NA3) which encode the operated condition of the switches logic values 00–11. (B.SW) is normally opened back stitching switch having one end connected to ground and the other end connected to one input terminal of AND circuit (AND1) and also connected to one input terminal of AND circuit (AND2) via an inverter (IN). The AND circuit (AND1) has an output terminal connnected to the up-input (UP) of an up-down counter (C), and AND circuit (AND2) has an output terminal connected to the down-input (Dn) of the same counter (C). (Vcc) is a control DC power source, and (R) (R') are conventional limiting resistors. The counter (C) is of the master-slave type and has a set of 4-bit output terminals $(A_O)$–$(A_3)$, which gives the decimal addresses 0–15 as shown in FIG. 3, and connected respectively to the input terminals $(A'_0)$–$(A'_3)$ of the pattern storing memory (RON). The monostable multivibrator (MM1) has a true side output terminal (Q) connected to the trigger terminal (CP) of the latch circuit (L) which has output terminals (d6, d7) respectively connected to the input terminals of exclusive OR circuits (Ex. OR1), (Ex. OR2) in match with the output terminals (D6, D7) of the memory (ROM). The respective outputs of these exclusive OR circuits are connected to the inputs of NOR circuit (NOR2) which has an output terminal connected to one of the input terminals of NOR circuit (NOR3) whose other input terminal is connected to the output (D5) of the memory (ROM). The output side of the NOR circuit (NOR3) is connected to a data terminal (D) of D type flip-flop circuit (F/F). (Dr) designates a needle bar actuator having input terminals connected to a set of 5-bit output terminals (D0)—(D4) of the memory (ROM) to control the swinging movement of the needle bar (4) as shown in FIG. 6. (P.S.) is a position sensor having an output terminal (OUT) connected to the trigger terminal of monostable multivibrator (MM2) which has a complement side terminal ($\overline{Q}$) connected to the preset terminal (Ps) of the flip-flop circuit (F/F). Thus the position sensor (P.S.) issues one signal per rotation of the machine shaft to preset the flip-flop (F/F) through the monostable multivibrator (MM2) when the needle bar is at a predetermined position. Though not shown, the flip-flop (F/F) is reset when the control power source (Vcc) is switched on, and the output (Q) becomes 0. The output (Q) is connected to the reset terminal (R) of an astable multivibrator (AM) which has a pulse output terminal ($\phi1$) connected to the input terminal (IN) of a time delay circuit (TD), and also connected to the other input terminals respectively of the AND circuits (AND1)(AND2). The output terminal ($\phi2$) of the time delay circuit (TD) and the true side output terminal (Q) of the monostable multivibrator (MM1) are connected to the trigger terminal (Cp) of the flip-flop circuit (F/F) via NOR circuit (NOR1). FIG. 5 shows the contents of one word composed of the output signals (D0)–(D7) of the memory (ROM). The signals (D0)–(D4) are, as aforementioned, adapted to control the stitches to be formed, and the signal at flip-flop input (D) becomes a logic value 1 when 0 and 4 are addressed in FIG. 3. The signal (D) becomes a logic value 0 when the other numbers are addressed to discriminate if the signals (D0)–(D4) correspond to the common stitches. The 2-bit signals (D6, D7) are pattern number designating signals to be compared with the outputs (d6, d7) of the latch circuit (L) which indicates which one of the pattern selecting switches (SW1)–(SW4) has been operated.

FIG. 6 is a perspective outlined view of the sewing machine of the invention, in which numeral (1) is a machine housing, (2) is an upper shaft, (3) is a lower shaft, (4) is a needle bar, (5) is a cloth feed dog, and (6) is a loop-taker. When the upper shaft (2) is rotated by an electric motor, the needle bar 4 is vertically moved via a crank mechanism and the lower shaft 3 is rotated via timing belt (7), and then the looptaker (6) is rotated. (Dr) is the needle bar actuator device as said above. The sewing controlling output from the actuator is transmitted to a swingable arm (9) via a swing control arm (8) and gives the needle bar (4) a lateral swinging movement via a transmission rod (11). (D'r) is a feed dog actuator for issuing a cloth feed control output to a control arm which swings an arm (13) which rocks a transmission rod (4), thereby to actuate the feed dog (5). These actuators (Dr), (D'r) comprise solenoids (S0)–(S4) and S'0)–(S'4) respectively for controlling the needle bar swinging movement and for controlling the feed dog movement by means of stitch control signals issued from the pattern controlling circuit of FIG. 4. Numeral (20) designates a part accommodating the control circuit of FIG. 4. Numeral (15) is a photo-transistor receiving light from a luminous diode (18) through a cut-out (17) in a shutter plate 16 secured on the upper shaft (2), to furnish the control circuit a signal synchronized with rotation of the upper shaft. This output signal is the output of said position sensor (P.S.).

Pattern selection switches (SW1)–(SW4) are positioned on the front part of the sewing machine, and a desired stitch pattern is selected by operating any one of the switches. The actuator (Dr) comprises an adder apparatus which includes the solenoids (S0)–(S4) and an adder mechanism (not shown) for controlling the needle bar swinging movement. Another actuator (D'r) comprises another adder apparatus which includes the solenoids and an adder mechanism (not shown) for controlling the movement of the feed dog. These adder apparatuses are respectively actuated by the solenoids (S0)–(S4) and (S'0)–(S'4), thereby to impart the shift amounts of relative ratios 1 : 2 : 4 : 8 : 16 to the output arms (8), (12) respectively. With the added combinations of these shift amounts, shift amounts from 0 to 31 units can be imparted to the needle bar and the feed dog respectively.

In the above mentioned structure, with reference to FIG. 4, if the control power source (Vcc) is switched on, the output (Q) of the flip-flop circuit (F/F) goes to logic value 0, and therefore the monostable multivibrator (AM) gives no output.

Then, if an optional pattern selection switch, e.g. switch (SW3) is operated, the outputs (d6), (d7) of Latch circuit (L) are latched at 1, 0. The counter(C) is reset via (NA1) and (MM1) and comes to a first address 0 in FIG. 3 and gives a stitching signal common to the co-ordinate numbers (1), (3), (6), (12) to the actuator (Dr)from the output terminals (D0)–(D4) of the memory (ROM). Since the output of the memory (ROM) in response to the first address 0 is D5=1, the data terminal (D) of the flip-flop circuit (F/F) is made 0, irrespectively of the value of the outputs (D6), (D7) of ROM and of outputs (d6), (d7) of Latch circuit (L), and the output (Q) is not inverted. Therefore since the counter (C) is not driven, the data of the common co-ordinates, in response to the terminal address 0, operates the actuator (Dr) to provide the stitch 6. As the sewing machine now operates and the position sensor (P.S) comes to a determined position, the monostable multivibrator (MM2) is triggered to preset the flip-flop circuit (F/F). Then the astable multivibrator (AM) is released from the reset condition, and issues successive pulse outputs ($\phi1$), with a period considerably faster than the rotation period of the sewing machine, to cause the counter (C) to count up via AND circuit (AND 1). The counter is of the master-slave type, and it transmits the counted data to its output terminals (A0)–(A3) each time the pulse at ($\phi1$) falls. With the first upwards count, the counter (C) gives a decimal output 1 corresponding to the address 1 in FIG. 3 for providing the coordinate number 7 which is included in the pattern 3. In this instance, the outputs (D6), (D7) of the memory (ROM) are 1, 0. These outputs are compared with the outputs (d6) (d7) of Latch circuit (L) to establish the relation D6=d6 and D7=d7, thereby to cause the data terminal (D) of the flip-flop circuit (F/F) to be 0. Thus at the time of the falling end of the delayed pulse ($\phi2$) derived from pulse ($\phi1$), the output (Q) of the flip-flop circuit (F/F) goes to 0, the generation of pulses at ($\phi1$) terminates at the count 1, and then the stitch 7 is formed. When the sewing machine is rotated and the position sensor (P.S) comes again to the determined position, the flip-flop circuit (F/F) is inverted and the counter (C) counts up to the address 2. But since the address 2 does not satisfy any of the relations D6=d6, and D7=d7 and D5=1, the flip-flop circuit (F/F) is not inverted and counting up is continued. When the count reaches address 3, the address satisfies D6=d6 and D7=d7, and the stitch 8 is formed. In the same way, the addresses satisfying D6=d6 and D7=d7 cause the output of the memory (ROM) to operate the actuator (Dr), thereby to form the stitches with every rotation of the sewing machine. In this embodiment of the invention, since the counter (C) has a set of 4-bit outputs, it counts up the address 0 after it has counted up the address 15, and thus a pattern is repeatedly formed. If the back stitching switch (B.SW) is pressed and then kept pressed beginning at the start or in the middle of a stitching of a pattern, the output ($\phi$1) of the astable multivibrator (AM) causes the counter (C) to count down via the AND circuit (AND2), so as to trace back the stitch numbers of the selected pattern. Thus back stitching of a pattern can be obtained.

As will be understood from the foregoing description of the invention, a set of common coordinates and pattern data is effectively arranged in the memory. Such arranged pattern data are all repeatedly read out one after another sequentially from the first to the last irrespectively of the particular pattern selected. In the prior art, the memory stores the pattern data in groups each associated with one specific, respective stitch pattern, and an addressing memory is additionally employed, which stores the initial addresses for the respective data groups, thereby to direct the addressing counter to its counting at the initial address for the selected pattern. In the prior art, each data group for a pattern in the memory included a return signal at the end of that data group, which directs the counter to repeatedly count up from the initial address of the selected pattern after the pattern is once formed.

This invention does not require such an addressing memory and return signals. Therefore the invention provides a simpler control system with less control data for providing various stitch patterns.

Further, regarding the back stitching of a pattern by tracing back the pattern data the prior art utilized two stored signals at the opposite ends of each data group as shown in FIG. 2 so as to repeatedly trace back the same pattern. However, in the present invention such back stitcing can be more easily obtained by simply causing the counter to count down without using such an arrangement of return signals.

Further in the prior art, since each initial address for each pattern data group stored in the pattern memory is memorized in the addressing memory and not in the pattern memory, a change of pattern data stored in the pattern memory, i.e., by substitution of pattern memories, is possible only when the spare pattern memory stores at least the initial stitch data for each such new pattern at addresses corresponding to the respective addresses already contained in the addressing memory. Otherwise the wrong address is initially designated by the address memory, and in effect, a deformed or imperfect pattern is provided. In other words, in the prior art, a change of the pattern memory is possible only when the spare memory stores data for patterns each of which has the same number of pattern stitches, as the old pattern represented by the data contained in the memory which is to be replaced.

However, in the present invention, the pattern data storing memory is itself used to determine the initial and final addresses of each pattern data group stored on it, and does not rely for this information on any other elements such as an addressing memory. A change of the pattern memory is completely optional and free from any consideration of the initial address or the number of pattern stitches in the spare memory. Thus additional stitch patterns can be produced.

We claim:

1. In a cyclically operating sewing machine, in combination, a static pattern memory having address inputs, data outputs and comprising a plurality of addressable storage locations storing pattern data for the constituent stitches of a plurality of selectable patterns; user-operated pattern-selector means operative when the user selects one of the selectable patterns for generating a pattern-identifying signal identifying the pattern thusly selected; addressing means connected to the address inputs and operative for addressing successive storage locations of the pattern memory by the application of successive address signals to the address inputs of the memory at a frequency greater than the frequency of the cycles of machine operation, whereby to cause the pattern data stored in successive storage locations of the memory to be produced at the data outputs of the memory, and including comparing means connected to the data outputs of the memory and to the pattern-selector means and operative for comparing the data successively produced at the data outputs of the memory against the pattern-identifying signal to automatically ascertain whether the data at the data outputs does or does not belong to the selected pattern and, if the data does not belong to the selected pattern, causing the addressing to continue until data which does belong to the selected pattern is produced at the data outputs, whereby during individual cycles of machine operation successive address signals are applied to the address inputs at high speed until data which does belong to the selected pattern appears at the data outputs; and stitching-forming means connected to the data outputs and responding to the data produced at the data outputs.

2. The sewing machine defined in claim 1, the addressing means comprising an addressing counter, the means causing the addressing to continue comprising a pulse generator furnishing pulses to drive the counter and means for causing the pulse generator to drive the counter until pattern data belonging to the selected pattern appears at the data outputs of the memory.

3. The sewing machine defined in claim 2, the addressing counter being a forwards-backwards counter, and furthermore including counter-direction selector means operable by the user for selecting the direction in which the counter is to count.

4. The sewing machine defined in claim 2, the addressing counter being a cyclical counter having an initial count and a final count and, when at the final count, responding to the next pulse received from the pulse generator by assuming the initial count.

* * * * *